United States Patent
Kasai et al.

(10) Patent No.: US 7,867,456 B2
(45) Date of Patent: Jan. 11, 2011

(54) HONEYCOMB STRUCTURE, METHOD OF MANUFACTURING THE STRUCTURE, AND EXHAUST EMISSION CONTROL SYSTEM

(75) Inventors: Yoshiyuki Kasai, Kasugai (JP); Reiji Matsubara, Aichi-gun (JP)

(73) Assignee: NGK Insulators, Ltd., Nagoya (JP)

(*) Notice: Subject to any disclaimer, the term of this patent is extended or adjusted under 35 U.S.C. 154(b) by 1018 days.

(21) Appl. No.: 10/502,775

(22) PCT Filed: Mar. 7, 2003

(86) PCT No.: PCT/JP03/02738
§ 371 (c)(1),
(2), (4) Date: Jul. 28, 2004

(87) PCT Pub. No.: WO03/076047
PCT Pub. Date: Sep. 18, 2003

(65) Prior Publication Data
US 2005/0095179 A1    May 5, 2005

(30) Foreign Application Priority Data
Mar. 8, 2002 (JP) .............................. 2002-063723

(51) Int. Cl.
*B01D 50/00* (2006.01)
*B01D 53/34* (2006.01)
*B01D 46/00* (2006.01)
*B01D 39/06* (2006.01)
*B01D 39/20* (2006.01)
*B01D 39/14* (2006.01)
*B01D 39/08* (2006.01)
*B01D 39/10* (2006.01)
*B32B 3/12* (2006.01)

(52) U.S. Cl. .................. 422/180; 422/177; 95/273; 55/330; 55/522; 55/523; 55/524; 55/525; 55/529; 428/116

(58) Field of Classification Search ............. 422/177, 422/180; 428/116; 55/522–525, 323, 330, 55/529; 95/273
See application file for complete search history.

(56) References Cited

U.S. PATENT DOCUMENTS

| | | | | |
|---|---|---|---|---|
| 4,233,351 A | * | 11/1980 | Okumura et al. | 502/439 |
| 4,386,497 A | * | 6/1983 | Takagi et al. | 60/296 |
| 4,535,589 A | * | 8/1985 | Yoshida et al. | 60/303 |
| 4,810,554 A | * | 3/1989 | Hattori et al. | 428/116 |
| 4,857,089 A | * | 8/1989 | Kitagawa et al. | 55/523 |

(Continued)

FOREIGN PATENT DOCUMENTS

EP    0 360 591 A2    3/1990

(Continued)

*Primary Examiner*—Walter D Griffin
*Assistant Examiner*—Natasha Young
(74) *Attorney, Agent, or Firm*—Oliff & Berridge, PLC (57) ABSTRACT

A honeycomb structure 1 having an outer wall 7, partition walls 2 disposed inside the outer wall, and a plurality of cells 3 partitioned from one another by the partition wall 2 and extending in the axial direction, each cell having a generally rectangular cross-section shape in the direction perpendicular to the axial direction. The honeycomb structure 1 is characterized in that the honeycomb structure 1 is provided with a reinforced part 72 on a part of the outer wall 7. The honeycomb structure may exhibit excellent mechanical strength and low pressure loss.

14 Claims, 9 Drawing Sheets

U.S. PATENT DOCUMENTS

| | | | | |
|---|---|---|---|---|
| 5,514,446 A | * | 5/1996 | Machida et al. | 428/116 |
| 5,526,462 A | * | 6/1996 | Kondo et al. | 392/485 |
| 5,629,067 A | | 5/1997 | Kotani et al. | |
| 5,750,026 A | * | 5/1998 | Gadkaree et al. | 210/502.1 |
| 5,853,459 A | | 12/1998 | Kuwamoto et al. | |
| 5,888,457 A | * | 3/1999 | Tosa et al. | 422/179 |
| 5,996,228 A | * | 12/1999 | Shoji et al. | 29/890 |
| 6,248,421 B1 | * | 6/2001 | Koike et al. | 428/116 |
| 6,316,384 B1 | * | 11/2001 | Bruck et al. | 502/439 |
| 2003/0039598 A1 | * | 2/2003 | Nishimura et al. | 422/177 |
| 2003/0049180 A1 | * | 3/2003 | Fukushima | 422/168 |

FOREIGN PATENT DOCUMENTS

| | | |
|---|---|---|
| EP | 0 449 556 A2 | 10/1991 |
| EP | 1 138 389 A1 | 10/2001 |
| GB | 2 071 640 A | 9/1981 |
| JP | A 55-155741 | 12/1980 |
| JP | A 58-45715 | 3/1983 |
| JP | B2 62-45439 | 9/1987 |
| JP | A 2-43955 | 2/1990 |
| JP | A 2003-26488 | 1/2003 |

\* cited by examiner

HONEYCOMB STRUCTURE, METHOD OF MANUFACTURING THE STRUCTURE, AND EXHAUST EMISSION CONTROL SYSTEM

TECHNICAL FIELD

The present invention relates to a honeycomb structure, a method of manufacturing the same and an exhaust emission control system comprising the same used in, for example, a filter for trapping fine particles present in an exhaust gas emitted from an internal combustion engine, a boiler or the like. Particularly the present invention relates to a honeycomb structure, a method of manufacturing the same and an exhaust emission control system comprising the same which is good in mechanical strength as well as low in pressure loss.

BACKGROUND ART

There is an increased need to remove harmful substances such as fine particles contained in an exhaust gas emitted from an internal combustion engine, a boiler or the like in consideration of the impact on the environment. In particular, regulations concerning removal of graphite fine particles (hereinafter, referred to as "PM") emitted from the diesel engine tend to be tightened in Europe and the United States as well as in Japan, so that attention is being given to use of a honeycomb structure in a collecting filter for removal of PM (hereinafter, referred to as "DPF: Diesel Particulate Filter") and an exhaust emission control system for an internal combustion engine using the honeycomb structure.

Figure 12A:
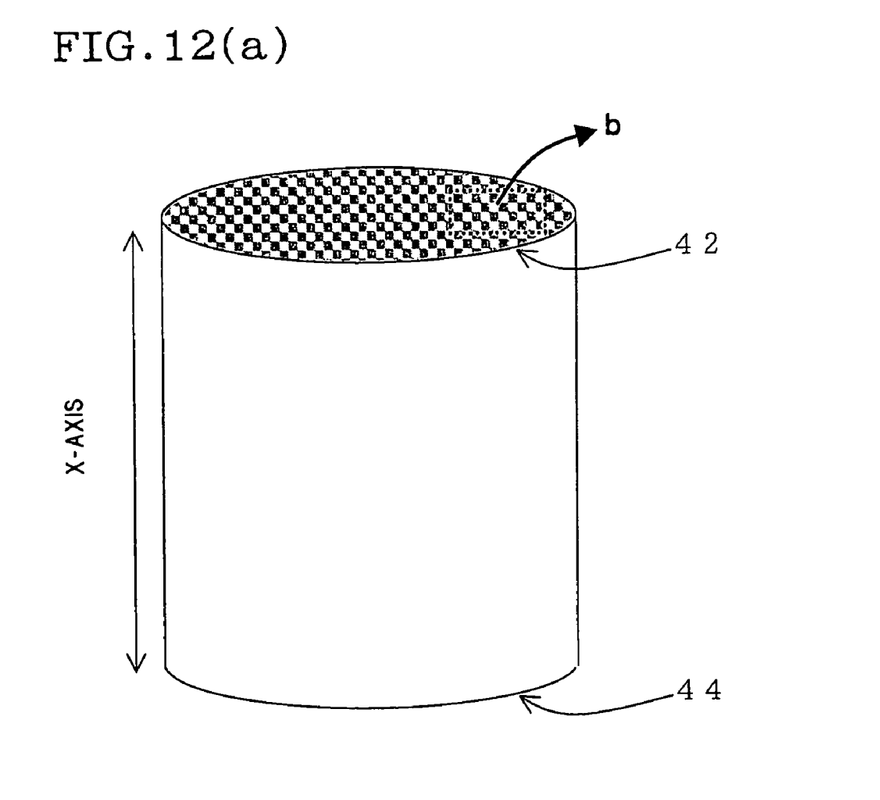
FIG. 12(a) is a schematic perspective view showing a conventional honeycomb structure.
Figure 12B:
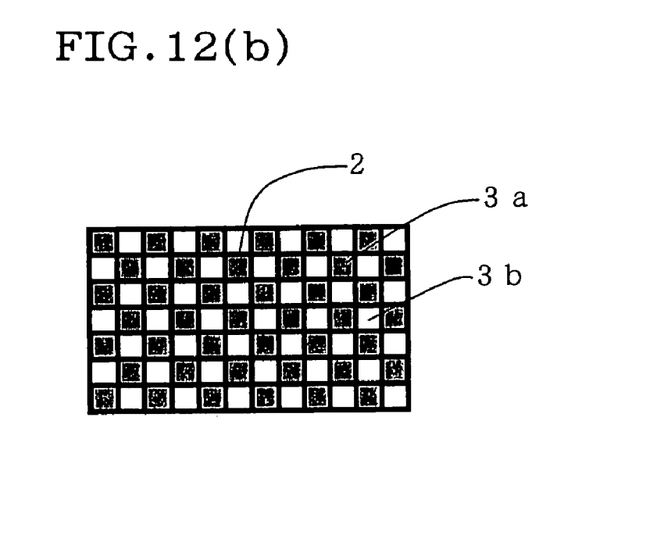
FIG. 12(b) is an enlarged view of FIG. 12(a).

In general, as shown in FIG. 12, the honeycomb structure for use in this purpose has a number of cells 3 partitioned from one another by partition walls 2. The cells extend through an X-axis direction. The honeycomb structure has a structure in which the cells 3 adjacent to each other are plugged in one end on an opposite side alternately so that end surfaces have checkered patterns. In such a honeycomb structure, subject fluid flows in the cell 3 not plugged at inflow end face 42, that is, plugged at outflow end face 44, passes through the porous partition walls 2, and is discharged via the adjacent cells 3, that is, the cell 3 plugged at the inflow end face 42 and not plugged at outflow end face 44. In this case, the partition walls 2 act as a filter. For example, PM discharged from a diesel engine is trapped by the partition walls and deposited on the partition walls.

The exhaust emission control system for an internal combustion engine that employs the filter of the aforementioned type as an emission control device suffers from pressure loss of exhaust gas. That is, pressure loss of exhaust gas occurs across the honeycomb structure, causing decrease in output of the internal combustion engine and deterioration in fuel consumption. For solving this problem, although it is useful to increase the porosity of the honeycomb structure for reducing the pressure loss, increase in porosity of the honeycomb structure usually causes decrease in mechanical strength of the honeycomb structure. Therefore, there is a need for a honeycomb structure and an exhaust emission control system using the same which is low in pressure loss and good in strength.

DISCLOSURE OF THE PRESENT INVENTION

The present invention was made in consideration of the above circumstances, and it is an object of the present invention to provide a honeycomb structure which is good in mechanical strength as well as low in pressure loss, a method of manufacturing the same, and an exhaust emission control system comprising the honeycomb structure.

As a result of detailed examination for strength of the honeycomb structure, the present inventors found that the weakest portion against the force from outside of the outer wall in the honeycomb structure lies in the direction of 45° with respect to the longitudinal direction of a partition wall about the sectional center in the cross section of the honeycomb structure. It was also found that when the honeycomb structure is held by a can (can body), in particular, cracking is likely to occur in that portion. It was also found that by reinforcing a certain range centered at a point in the direction of 45° on the outer wall, a honeycomb structure causing less elevation of pressure loss and having improved strength is obtained.

The present invention is based on the above findings, and first provides a honeycomb structure (first aspect) including an outer wall; partition walls disposed inside the outer wall; and a plurality of cells partitioned from one another by the partition walls, extending in the axial direction, each cell having a generally rectangular cross-section shape in the direction perpendicular to the axial direction, characterized in that the honeycomb structure has a reinforced part in a part of the outer wall, and the reinforced part in the cross section perpendicular to the axial direction of the honeycomb structure lies at least in the range from the point located at 40° on the outer wall to the point located at 50° on the outer wall and within the range from the point located at 30° on the outer wall to the point located at 60° on the outer wall, with respect to the longitudinal direction of the partition wall about a sectional center of the honeycomb structure; and a mean thickness of the reinforced part in the perpendicular cross-section in the direction of the sectional center is in the range of 1 to 10 mm.

In the first aspect of the present invention, the reinforced part is preferably formed by plugging of the cell. A sum of length of the reinforced part in the axial direction of the honeycomb structure is preferably ⅓ or more relative to whole length of the honeycomb structure in the axial direction. The partition walls and the outer walls preferably contain ceramics as a main component. It is more preferable that a main component of the ceramics is one or more kinds selected from the group consisting of alumina, mullite, lithium aluminum silicate, cordierite, silicon carbide and silicon nitride. A porosity of the partition wall is preferably 50% or more. The present invention can preferably be applied to the honeycomb structure having compressive strength in the axial direction in a range of 0.5 to 10 MPa. It is preferable that opening ends of predetermined cells are plugged at one end face and opening ends of a predetermined cells of the remaining cells are plugged at the other end face. It is also preferable that a catalyst having a promotion capability of burning diesel particulate matter.

Secondly, the present invention provides an exhaust emission control system (second aspect) including: an internal combustion engine; an exhaust pipe for discharging an exhaust gas from the internal combustion engine; and an emission control apparatus, connected to the exhaust pipe, for cleaning the exhaust gas, characterized in that the emission control apparatus includes at least one honeycomb structure as described above, and further includes a cushioning material disposed on the outer circumference of the honeycomb structure and a can holding at least therein the honeycomb structure via the cushioning material.

Thirdly, the present invention provides a method of manufacturing a honeycomb structure (third aspect) having an outer wall; partition walls disposed inside the outer wall; a plurality of cells partitioned from one another by the partition walls, extending in the axial direction, each cell having a generally rectangular cross-section shape in the direction perpendicular to the axial direction; and a reinforced part provided in a part of the outer wall, the method comprising the steps of: forming a formed body of the honeycomb structure; firing the formed body to form a fired body; and reinforcing for formation of the reinforced part, characterized in that the reinforcing step is to form the reinforced part such that it lies at least in the range from the point located at 40° on the outer wall to the point located at 50° on the outer wall and within the range from the point located at 30° on the outer wall to the point located at 60° on the outer wall, with respect to the longitudinal direction of the partition wall about a sectional center of the honeycomb structure; and a mean thickness of the reinforced part in the perpendicular cross-section in the direction of the sectional center is in a predetermined range of 1 to 10 mm.

In the third aspect of the present invention, preferably, the reinforcing step is plugging opening ends of at least two adjacent cells located within the predetermined range on the same end face; preferably, the reinforcing step includes cutting at least part of the fired body in the predetermined range and disposing a reinforcing material in the cut part; and preferably, the cutting step includes cutting the outer circumference of the fired body and cutting at least part of the partition wall within the predetermined range.

BEST MODE FOR CARRYING OUT THE INVENTION

Next, referring to the attached drawings and taking a honeycomb structure for DPF as an example, description will be made on a honeycomb structure which is the first aspect of the invention, an exhaust emission control system which is the second aspect of the invention, and a method of manufacturing a honeycomb structure which is the third aspect of the invention. It is to be noted the present invention is not limited to the following embodiments. It is to be noted that in the following a section means a section perpendicular to the longitudinal direction of the cells, that is the X-axis direction of FIG. 1, unless especially mentioned. In the present invention, the term "axial direction" means the longitudinal direction of a cell (X-axis direction in FIG. 1).

Figure 1A:
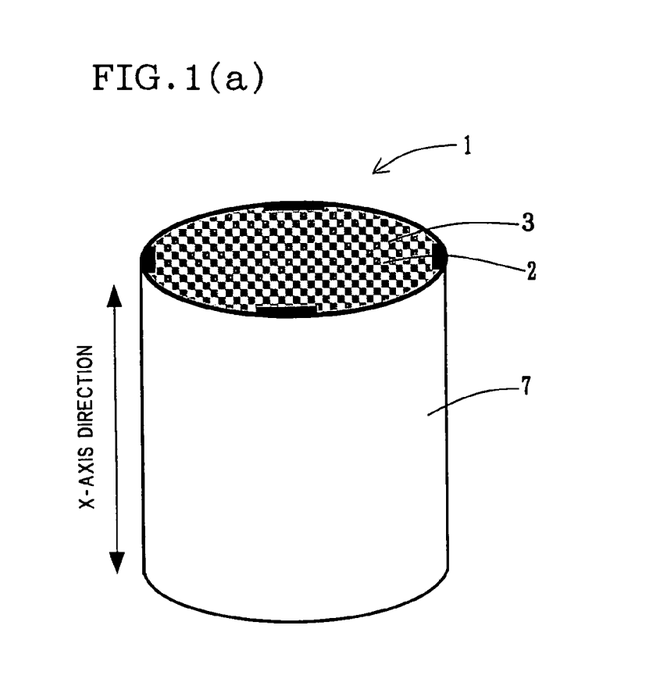
FIG. 1(a) is a schematic perspective view showing one embodiment of a honeycomb structure of the present invention.
Figure 1B:
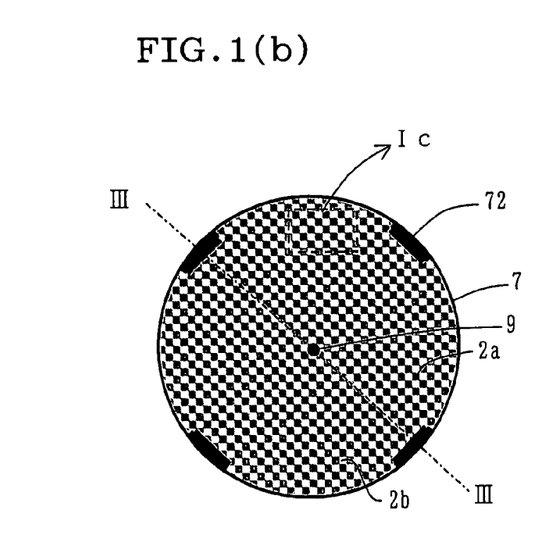
FIG. 1(b) is schematic plane view showing one embodiment of a honeycomb structure of the present invention and FIG. 1(c) is a partially enlarged view of the portion Ic of FIG. 1(b).
Figure 1C:
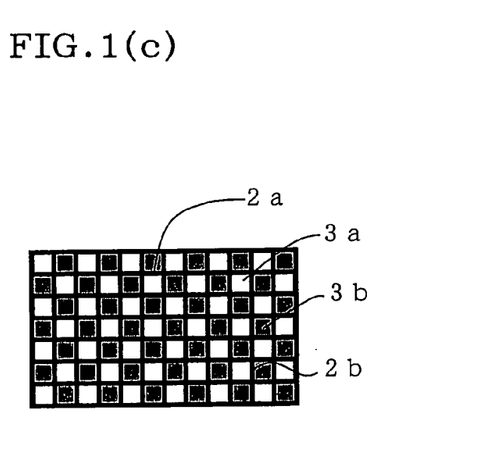

As shown in FIG. 1(a), FIG. 1(b) and FIG. 1(c), for example, the honeycomb structure which is the first aspect of the present invention is a honeycomb structure 1 having an outer wall 7, partition walls 2a and 2b disposed inside the outer wall 7, and a plurality of cells 3a and 3b partitioned from one another by the partition walls 2a and 2b and extending in the axial direction, each having a generally rectangular cross section shape. When the honeycomb structure of the present invention is used as a DPF, the structure as shown in FIG. 1(c) is employed in that opening ends of a predetermined number of cells 3a are plugged on one end face, while opening ends of the remaining predetermined number of cells 3b are plugged on the other end face (not shown). However, this structure is not an essential feature of the invention. The black or gray mark in FIGS. 1(a) to 1(c) and in the following drawings represents that the cell is plugged on that end face.

Figure 2:
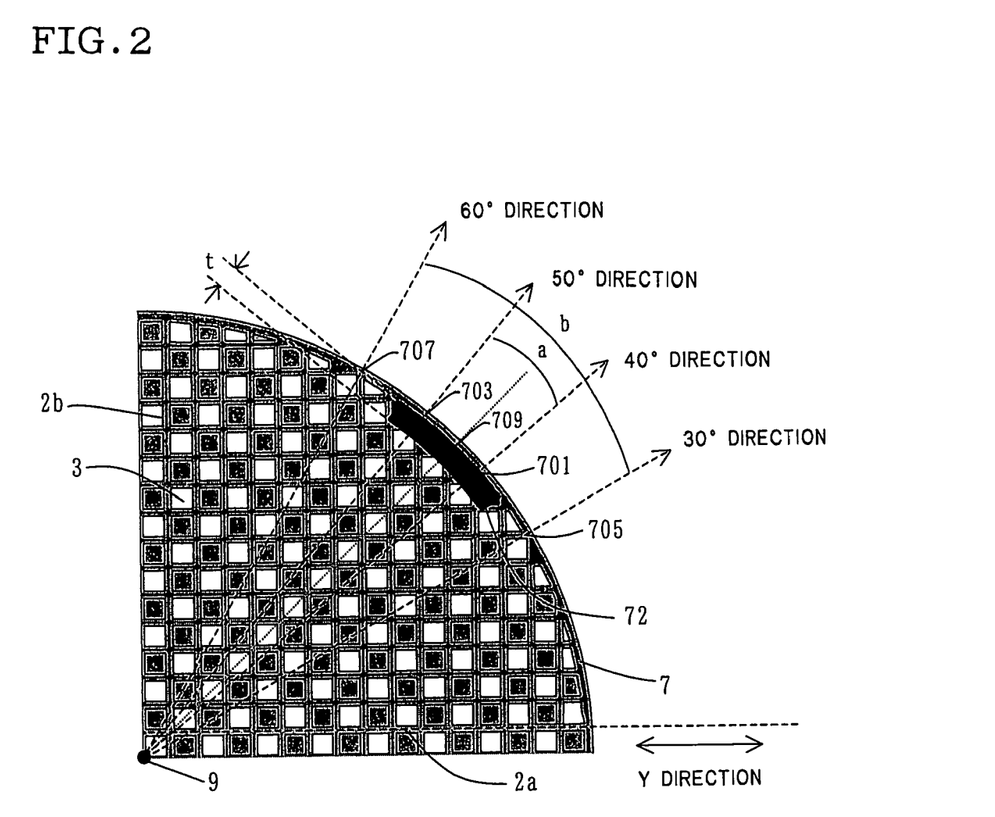
FIG. 2 is an enlarged view of the ¼ portion of FIG. 1(b).

The significant feature of the first aspect of the present invention is: as shown in FIG. 1(b), for example, a reinforced part 72 is formed on a part of the outer wall 7; and as shown in FIG. 2, the reinforced part lies, in the cross section of the honeycomb structure, at least in the range from a point 701 located at 40° on the outer wall 7 with respect to the longitudinal direction (Y direction) of the partition wall 2a about a sectional center 9 of the honeycomb structure 1 to a point 703 located at 50° on the outer wall 7 with respect to the longitudinal direction of the partition wall 2a about the sectional center 9 of the honeycomb structure 1, and lies in the range from a point 705 located at 30° on the outer wall 7 with respect to the longitudinal direction of the partition wall 2a about the sectional center 9 of the honeycomb structure 1 to a point 707 located at 60° on the outer wall 7 with respect to the longitudinal direction of the partition wall 2a about the sectional center 9 of the honeycomb structure 1; and a mean thickness t of the reinforced part 72 in the direction of the sectional center 9 is in the range of 1 to 10 mm.

As described above, the poor strength of the outer wall at the point of 45° with respect to the partition wall about the sectional center may attribute to the fact that the cells adjacent to the outer wall have incomplete cross-section shapes, and the cell adjacent to the outer wall at 45° point has most incomplete cross-section shape. Therefore, as shown in FIG. 2, by reinforcing the outer wall in the range of at least ±5° around a point 709 which is located at 45° on the outer wall 7 with respect to the longitudinal direction of the partition wall 2a about the sectional center 9 of the honeycomb structure (range "a" in FIG. 2), it is possible to produce a honeycomb structure having increased strength.

On the other hand, if the range of reinforcement is too wide, for example, reinforcing is effected on the entire outer wall, the effective area of the honeycomb structure is reduced so that the pressure loss increases. For this reason, by reinforcing only the part of the outer wall ranging within ±15° around the point 709 (range "b" in FIG. 2) on the outer wall 7 located at 45° with respect to the longitudinal direction of the partition wall 2a about the sectional center 9 of the honeycomb structure, it is possible to prevent pressure loss from occurring and to produce a honeycomb structure having excellent strength. In this description, the term "sectional center" means the center of figure of the cross section of the honeycomb structure.

In the first aspect, the outer wall should have at least one reinforced part. When the cell 3 has a rectangular cross-section shape as shown in FIG. 2, the partition wall consists of the partition wall 2a parallel to one direction and the partition wall 2b perpendicular to the one direction. Accordingly, as shown in FIG. 1(*b*), the outer wall can be reinforced at four points at maximum, and preferably, the reinforced part is provided at all of these four points. In the first aspect, the honeycomb structure has a cell having a generally rectangular cross-section shape. The term "generally rectangular shape" refers to the shape formed by the partition walls crossing with each other at four points on the cross section. More specifically, the sides (or partition walls) forming the rectangular shape are not necessarily perfectly linear, and each vertex formed by crossing partition walls may have a curvature. Preferably, the partition walls intersect at right angles, and more preferably, they intersect at right angles so that the cross-section shape of each cell is substantially square. Furthermore, it is preferred that each partition wall is formed linearly from one point on the outer wall to the other one point on the outer wall.

In the first aspect, the reinforced part has a mean thickness in the direction of sectional center ranging from 1 to 10 mm, preferably from 2 to 5 mm. If the thickness is too small, the reinforcing effect is inadequate, while if the thickness is too large, the pressure loss increases too much extent to lead unfavorable result. Another preferred embodiment is that the reinforced part is formed inside the outer wall as shown in FIG. 2. There is also the case that no boundary is formed between the outer wall and the partition wall by forming the outer wall and the reinforced part in integrated manner. In this case, the mean thickness of the reinforced part in the direction of sectional center means a difference between the mean thickness of the total of the outer wall and the reinforced part in the reinforced part and the mean thickness of the outer wall where the reinforced part is not formed.

Figure 3:
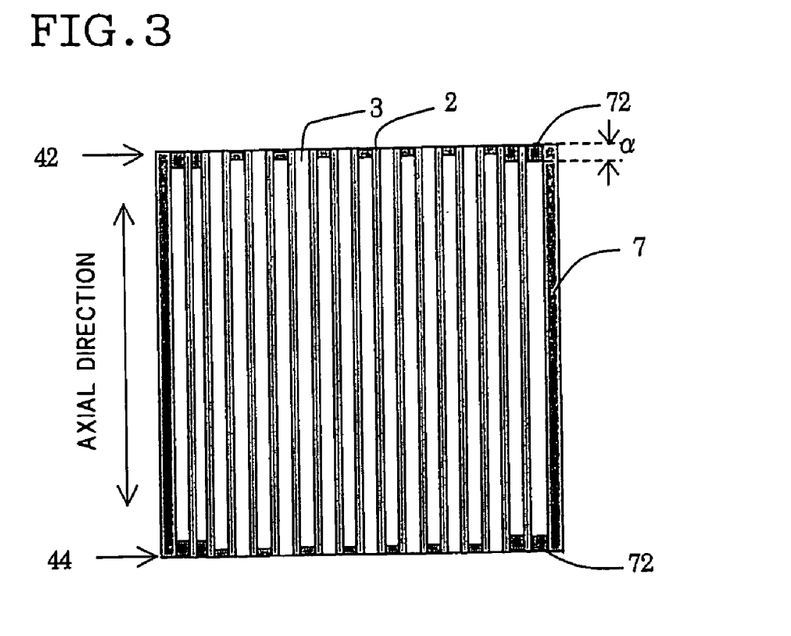
FIG. 3 is a sectional view of III-III section of FIG. 1(a).

As shown in FIG. 3, the embodiment that the reinforced part 72 is formed near either one or both of the end faces 42 and 44 is preferable from the view point of preventing edge end portions from being chipped when the honeycomb structure is inserted into a can, for example. It is preferred that the reinforced part of the embodiment as shown in FIG. 3, is formed, for example, by plugging the cells 3 lying in the above-mentioned range to be reinforced. The depth a in the axial direction of the reinforced part (longitudinal direction of cell) when the reinforced part is formed by plugging is preferably 2 mm or more because the depth smaller than this can not sufficiently provide reinforcing effect.

Figure 4:
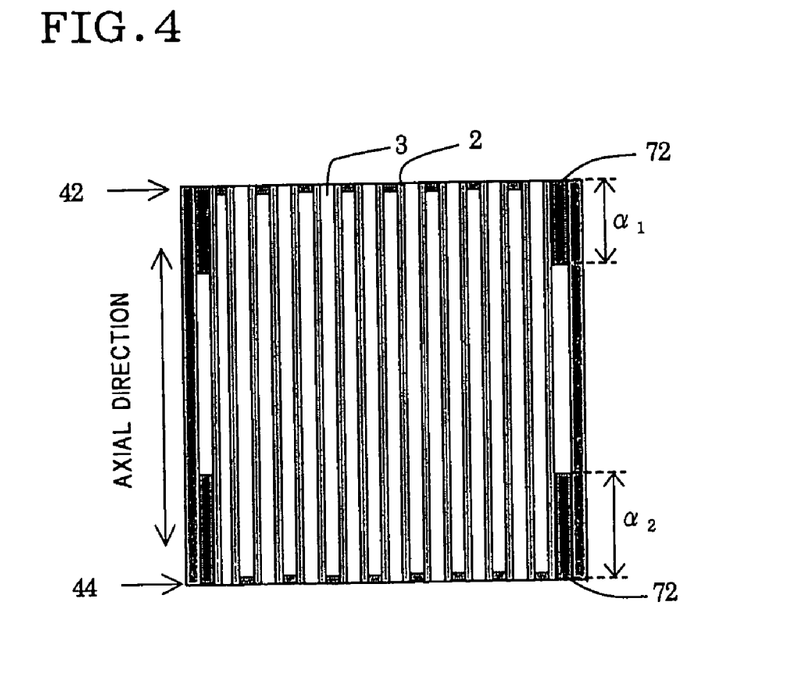
FIG. 4 is a schematic sectional view of the section corresponding to FIG. 3 showing another embodiment of a honeycomb structure of the present invention.
Figure 5:
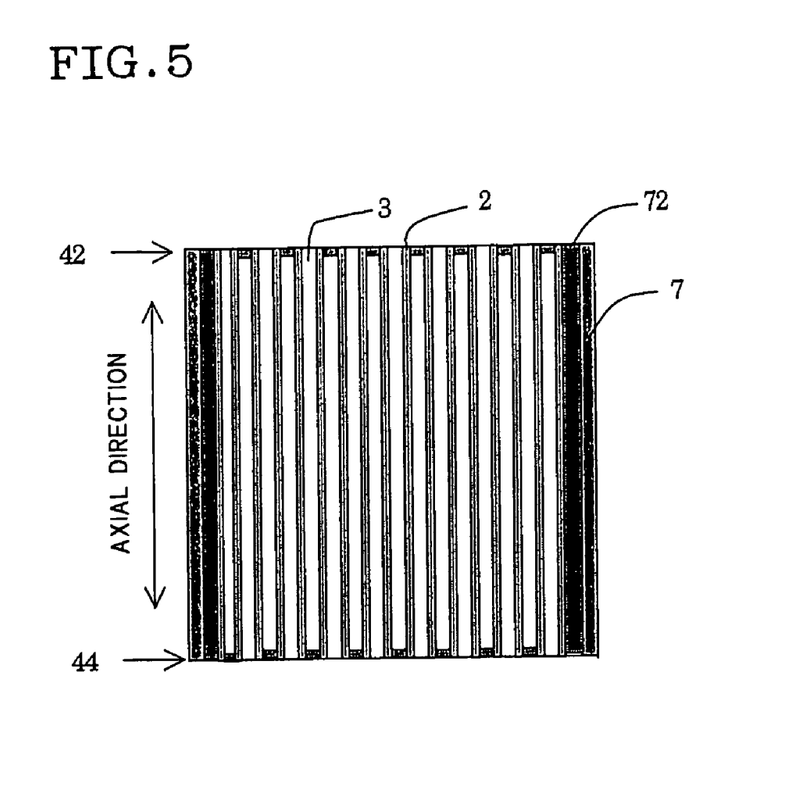
FIG. 5 is a schematic sectional view of the section corresponding to FIG. 3 showing still another embodiment of a honeycomb structure of the present invention.

From the view point of improvement of pressure resistance in such a situation that the honeycomb structure is held by a can via a cushioning material, the total depth of the reinforced part in the axial direction, preferably the total depth of the reinforced part positioned at the same position viewed in the cross section, namely the sum of $á_1$ and $á_2$ in FIG. 4 is preferably ⅓ or more relative to the entire axial length of the honeycomb structure. In this case, the reinforced part may be provided from each end face to a predetermined depth as shown in FIG. 4, from either one end face to a predetermined depth, or in the center part of the axial direction. Combination of these is also applicable. Also it is a preferred from the view point of improving the reinforcing strength that the reinforced part is formed in the entire range from the end face 42 to the end face 44.

In the first aspect, the partition wall and the outer wall of the honeycomb structure is preferably formed primarily of ceramics, and examples of the ceramics include a variety of ceramics of oxides or non-oxides, concretely, alumina, mullite, lithium aluminum silicate, cordierite, silicon carbide, silicon nitride, spinel, silicon carbide/cordierite based composite material, silicon/silicon carbide based composite material, silicon nitride, aluminum titanium and the like. Among others, one or more than one selected from the group consisting of alumina, mullite, lithium aluminum silicate, cordierite, silicon carbide and silicon nitride is preferred from the view point of the strength, heat resistance and the like. Here, it is meant that the "main component" constitutes 50% by mass or more, preferably 70% by mass or more, further preferably 80% by mass or more of the honeycomb structure. Although the reinforced part may be formed of the same or different material from that of the outer wall, the main components are preferably the same material.

In the first aspect, when the honeycomb structure is used as a DPF, the partition wall is preferably a porous material serving as a filter. In the case where the partition wall and the outer wall are made of such a porous material, too small porosity is unfavorable because the pressure loss increases too much extent. To the contrary, if the porosity is too large, the pressure loss is generally reduced, while the strength decreases, making it preferable to give some reinforcement. Therefore, the porosity is preferably 50% or more and more preferably, 60% or more. On the other hand, if the porosity is too large, the strength decreases too much extent even in the case of the honeycomb structure according to the first aspect. Therefore, the porosity is preferably 75% or less.

The first aspect of the present invention exerts more remarkable effect by being applied to the honeycomb structure in which axial compressive strength is poor. However, if the axial compressive strength is too poor, practically available strength can not be obtained even when the first aspect of the present invention is applied. Therefore, the range of axial compressive strength where the first aspect can be applied more effectively is from 0.5 to 10 MPa.

When the honeycomb structure according to the first aspect is used as a DPF, predetermined cells are plugged as described above. This plugging enables subject fluid to flow into the cell 3b which is open, for example, at one end face 42, pass through the porous partition walls 2, and be discharged from the cell 3a which is open at other end face 44. At this time, the partition walls 2 serve as a filter and ensure a large filtering area. In such a situation, it is preferred that all of the cells are plugged on at least one end face, and also it is preferred to plug the cells 3 on either one end face so that opening ends of adjacent cells 3 are positioned on the opposite sides and hence each end face shows checkered patterns as shown in FIGS. 1(*a*) to (*c*). However, when the reinforced part is formed by plugging, the cells other than those forming the reinforced part are preferably plugged at either end so that the opening ends are alternately located in opposite directions.

The material used for plugging cells that form the reinforced part and/or cells other than those forming the reinforced part preferably includes one or more kinds of ceramics selected from the ceramics recited as preferred materials for the partition wall and the outer wall of the honeycomb structure. Preferably, formation of the reinforced part by plugging is achieved in simultaneous with plugging of the cells other than those forming the reinforced part.

When the honeycomb structure of the first aspect is used as a DPF, in order to regenerate the honeycomb structure by burning the PM trapped in the honeycomb structure, a catalyst capable of promoting burning of PM is preferably held.

Figure 7:
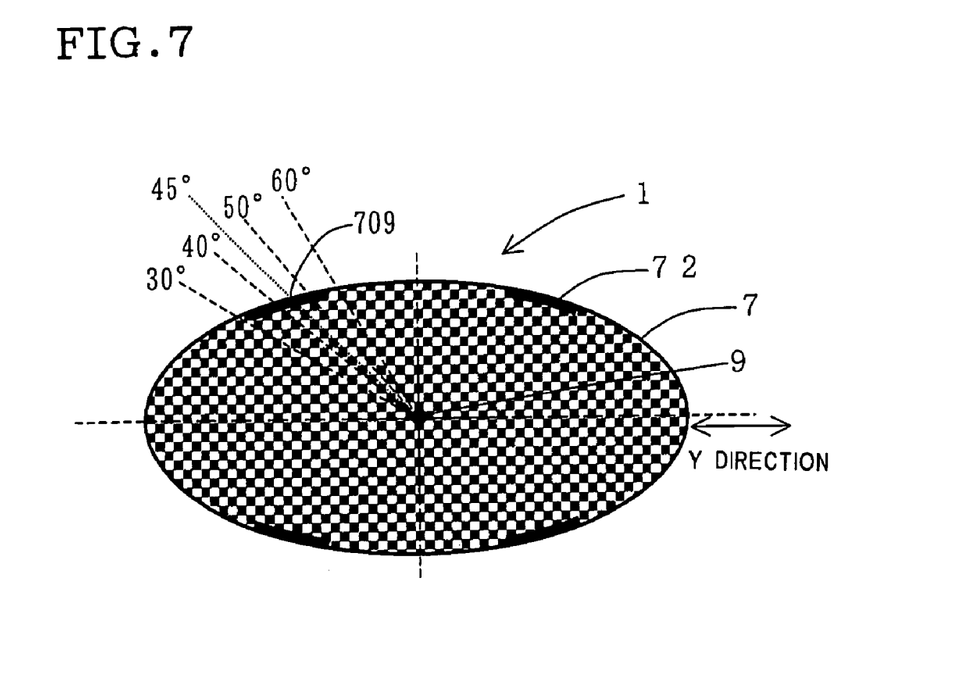
FIG. 7 is a schematic plane view showing still another embodiment of the honeycomb structure in the present invention.

In the first aspect, the cross-section shape of the honeycomb structure is not particularly limited, and a shape of track field, oval shape as well as the elliptic shape as shown in FIG. 7 can be employed without limiting to the circular shape as shown in FIG. 1(b). For example, also in the elliptic shape shown in FIG. 7, it is possible to achieve the effect of the present invention by providing the outer wall 7 with a reinforced part located within the range of ±15° including at least the range of ±5° centered at the point 709 on the outer wall 7 which is 45° with respect to the y direction about the sectional center 9 of the honeycomb structure. Also in the first aspect of the invention, the thicknesses of the partition wall and the outer wall of the honeycomb structure are not particularly limited, and can be appropriately set in accordance with the property of the subject fluid.

Figure 6A:
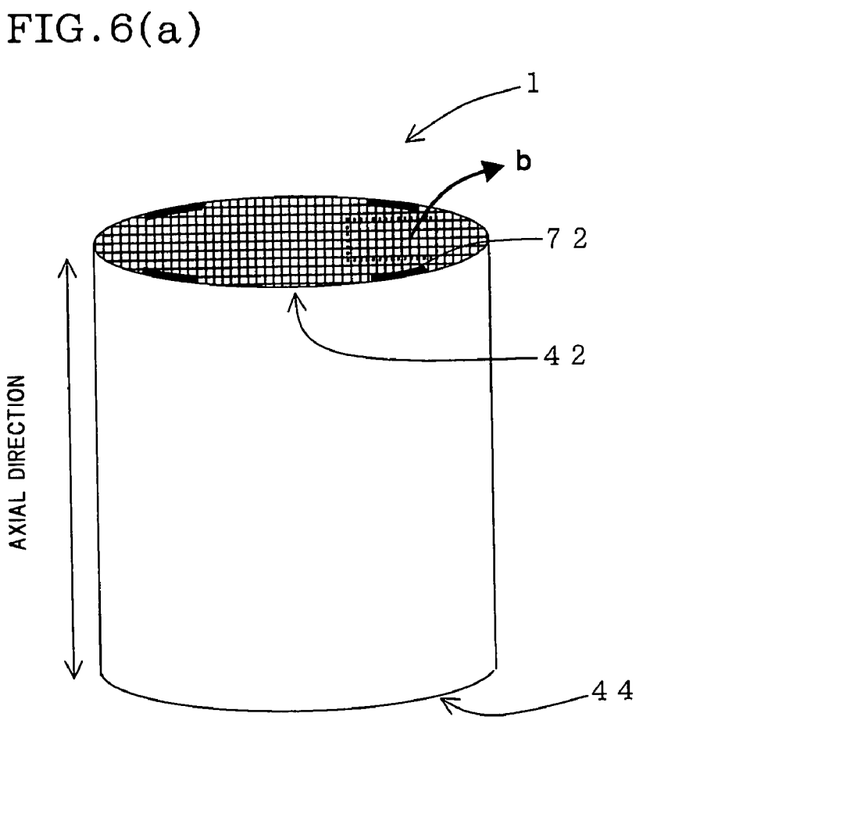
FIG. 6(a) is a schematic perspective view showing still another embodiment of a honeycomb structure of the present invention.
Figure 6B:
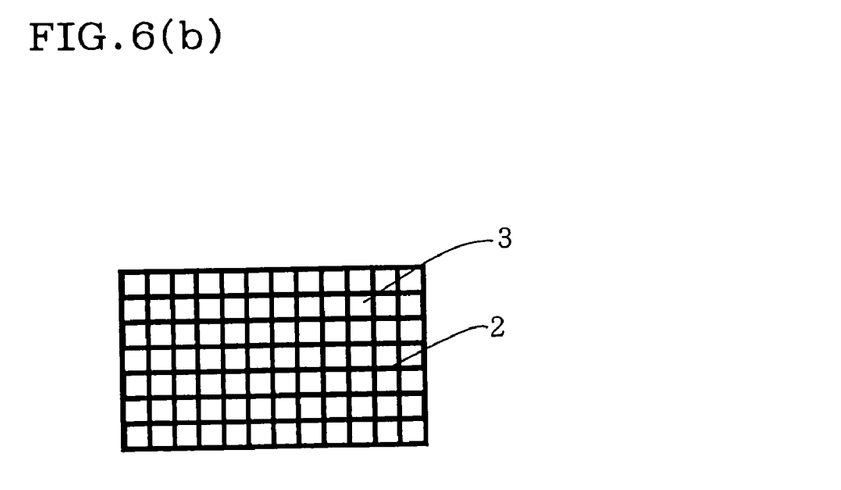
FIG. 6(b) is an enlarged view of the portion b of FIG. 6(a).

In the above description, description was made on the honeycomb structure of the first aspect of the present invention by primarily explaining the honeycomb structure to be used as a DPF. However, the honeycomb structure may be applied to catalyst carriers and the like as well as a variety of filters without limiting to the DPF because the entire strength is substantially improved only by partial reinforcement by applying the first aspect. For example, the honeycomb structure that is used as a catalyst carrier for an exhaust emission control of automobiles and the like has a structure lacking plugs as shown in FIGS. 6(a) and 6(b) and a catalyst is held by the partition walls 2. When the honeycomb structure according to the first aspect of the present invention is employed for this structure, it is possible to reduce the thicknesses of the partition wall and the outer wall.

Figure 8:
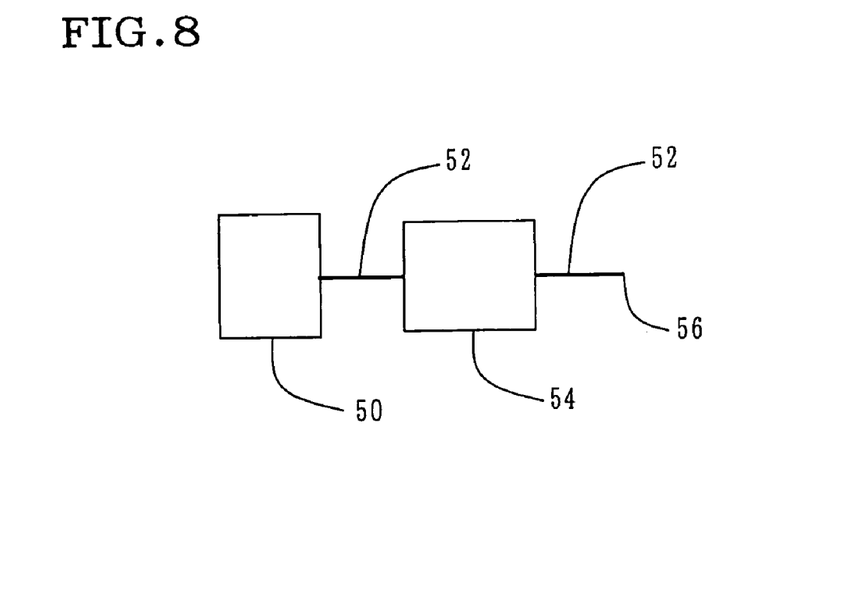
FIG. 8 is a schematic view showing an exhaust emission control of the present invention.
Figure 9A:
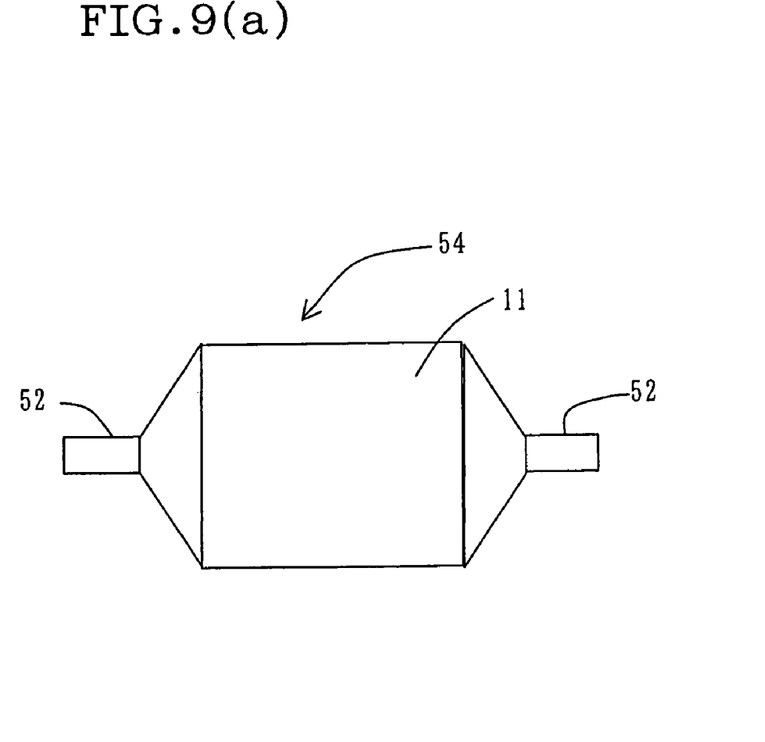
FIG. 9(a) is a schematic front view and FIG. 9(b) is a schematic sectional view showing an emission control apparatus of the present invention.
Figure 9B:
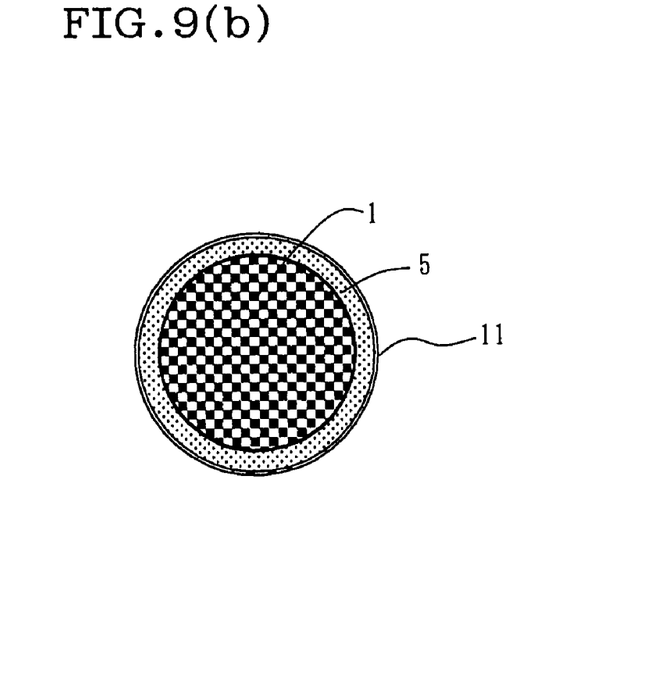

Next, description is made on an exhaust emission control system which is the second aspect of the present invention. The exhaust emission control system according to the second aspect includes an internal combustion engine 50, an exhaust pipe 52 for discharging an exhaust gas from the internal combustion engine and an emission control apparatus 54, connected to the exhaust pipe 52, for cleaning the exhaust gas as shown in FIG. 8, for example. As shown in FIGS. 9(a) and 9(b), for example, the emission control apparatus 54 has at least one honeycomb structure 1 of the first aspect, as well as a cushioning material disposed on the outer circumference of the honeycomb structure 1 and a can 11 that holds at least therein the honeycomb structure 1 of the first aspect via the cushioning material 5.

In the second aspect, the cushioning material 5 is used for equalization and appropriateness of holding pressure in holding the honeycomb structure 1 within the can 11. Preferably, the cushioning material has heat resistance and cushioning ability, as well as sealing ability. Preferred materials for the cushioning material include ceramics and metals, for example, alumina, mullite, silicon carbide, silicon nitride, zirconia, titania and the like. Preferably, the cushioning material is ceramic fibers or the like based on one or more kinds of these materials. More preferably, it is a mat made of such fibers.

The can 11 protects the honeycomb structure 1 against an external impact, and facilitates an installation into an apparatus having an internal combustion engine such as automobiles. Preferably, it is made from a can body of metal such as stainless. Within the can 11, at least one honeycomb structure of the first aspect is provided. However, two or more honeycomb structural bodies of the first aspect may be provided and other honeycomb structure may be provided.

The emission control apparatus 54 is connected with the exhaust pipe 52 as shown in FIG. 9(a), for example. The emission control apparatus 54 may be disposed between the internal combustion engine 50 and an exhaust outlet 56 as shown in FIG. 8, preferably disposed near the internal combustion engine 50. As the internal combustion engine 50, in particular, a diesel engine is preferably used, and it is preferred to place in the emission control apparatus the honeycomb structure wherein the cells other than those forming the reinforced part are plugged in checkered patterns in the first aspect, and to use it as a DPF.

Next, description is made on a method of manufacturing the honeycomb structure which is the third aspect of the present invention. In the method of manufacturing a honeycomb structure according to the third aspect, first, a honeycomb formed body which has a plurality of cells extending in the axial direction and is partitioned from one another by the partition walls is formed by way of forming process. The forming method of the honeycomb formed body in the forming step is not particularly limited, and forming is conducted in the following process.

As a material to be fired, for example, one or more kind of materials selected from alumina, mullite, lithium aluminum silicate, cordierite forming raw materials, silicon carbide, silicon nitride, spinel, aluminum titanium and metal silicon is used, to which binders such as methyl cellulose and hydroxypropoxypropoxymethyl cellulose, surfactants, water and the like are added to prepare a kneaded compound having plasticity. The kneaded compound is subjected to, for example, extrusion forming to form a honeycomb formed body having an outer wall, partition walls and cells partitioned by partition walls and extending in the axial direction. Here, the cordierite forming raw material is cordierite or a raw material turned into cordierite by the firing. The raw material turned into cordierite by the firing is the material including, for example, a mixture selected among talc, kaolin, calcinated kaolin, alumina, aluminum hydroxide, and silica mixed at a predetermined ratio such that a chemical composition in the mixture is in a range of 42 to 56% by mass of $SiO_2$, 30 to 45% by mass of $Al_2O_3$, and 12 to 16% by mass of MgO.

Next, the honeycomb formed body is fired in a firing step. First, the honeycomb formed body is dried, for example, by microwave and hot air, and then the honeycomb formed body is fired to form the honeycomb structure. The firing temperature and the firing atmosphere depend on the ceramic materials in use, and one skilled in the art can appropriately select the firing temperature and the firing atmosphere which are suited for the selected ceramic material. For example, oxide-type materials such as cordierite forming raw materials and mullite are preferably fired in the room air atmosphere in usual, and cordierite forming raw materials are preferably fired under the temperature of 1400° C. to 1440° C.

A reinforcing step is to form a reinforced part extending at least the range from the point 701 located at 40° on the outer wall to the point 703 located at 50° on the outer wall and within the range from the point 705 located at 30° on the outer wall to the point 707 located at 60° on the outer wall, with respect to the longitudinal direction (Y direction) of the partition wall 2a about the sectional center 9 of the honeycomb structure, and having a mean thickness of the reinforced part in the perpendicular cross-section in the direction of the sectional center with a predetermined range of 1 to 10 mm.

One preferred concrete example of the reinforcing step is reinforcement by plugging step in which opening ends of at least two adjacent cells located in the above predetermined range are plugging on the same end face. In the plugging step, for example, a material to be used for plugging in the form of slurry is placed to close open end faces of the cells located in the predetermined range, which is then dried and fired. The plugging process is preferably conducted after the forming step and before the firing step in the above manufacturing process of the honeycomb structure because only one firing step is required in that case. However, the plugging may be conducted after firing step or otherwise at any points after the forming. The material to be used for plugging may be selected from the materials given as the concrete examples of the material to be fired. However, it is preferred to select the material having similar quality as that of the selected material to be fired.

When the honeycomb structure manufactured by the third aspect is used in a filter, in particular, a DPF or the like, as shown in FIG. 1(c), it is preferred that opening ends of a predetermined number of cells 3a are plugged on one end face, while opening ends of the remaining predetermined number of cells 3b are plugged on the other end face which is invisible in the drawing. In this case, preferably, the adjacent cells are plugged on their opening ends on the opposite end faces. Also in the third aspect, it is preferred that the reinforcing step is achieved by the plugging process that plugs the opening ends of at least two adjacent cells on the same end face. When the cells other than those forming the reinforced part are plugged so that opening ends of the adjacent cells are plugged on the opposite end faces as described above, these steps are preferably conducted at once.

Figure 10:
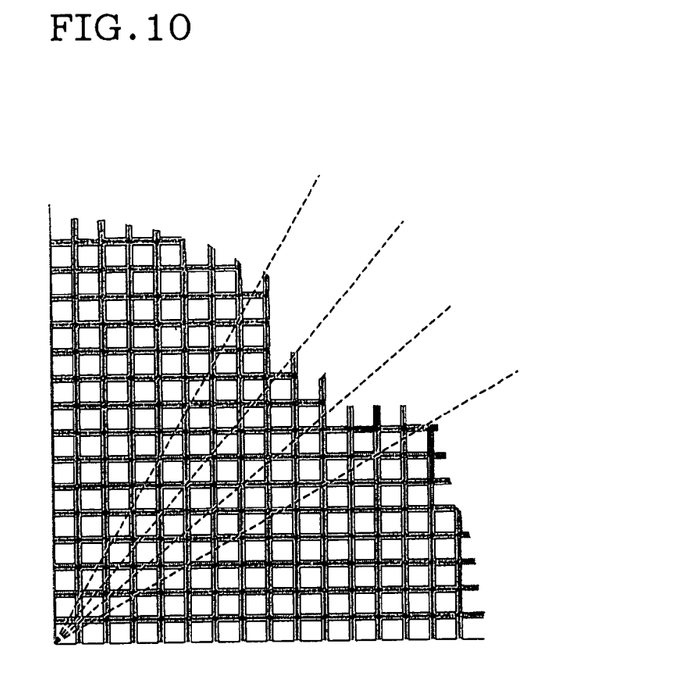
FIG. 10 is a schematic sectional view showing one embodiment of the fired body after cutting according to the present invention.

Another preferred concrete example of the reinforcing step is the method that includes the steps of cutting at least part of the partition wall and/or outer wall within the predetermined range to be reinforced and disposing a reinforcing material on the cut part. For example, a part or whole of the partition wall corresponding to the reinforced part 72 in FIG. 2 is removed by cutting. At this time, the outer wall and/or partition wall may be cut in parts other than the reinforced part. For example, as shown in FIG. 10, it is preferred that the entire outer wall is cut and a part of the partition wall is cut as appropriate, and additionally the partition wall is cut in the reinforced part to larger extent in the direction of the sectional center than the partition wall in the part other than the reinforced part. In this case, preferably, the cutting is conducted so that the outer wall of the reinforced part to be formed in the subsequent disposing step is larger in thickness by 1 to 10 mm than the outer wall of the part other than the reinforced part.

Figure 11:
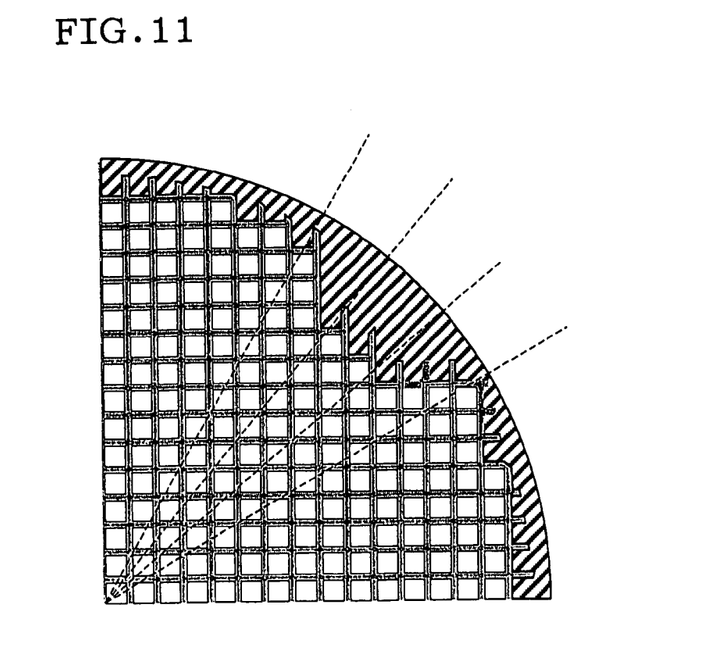
FIG. 11 is a schematic sectional view showing one embodiment after disposing a reinforcing material in the disposing step according to the present invention.

Next, a reinforcing material is disposed in the part where the partition wall is removed by cutting. Components of the reinforcing material may be selected, for example, from the materials given as concrete examples of the material to be fired of the honeycomb structure. Ceramic cements prepared by adding inorganic binders, for example, to such materials and the like are preferably used as the reinforcing material. For example, when only the reinforced part is cut, the reinforcing material may be disposed only in the cut reinforced part, however, when the cutting is conducted on the outer wall as well, as shown in FIG. 10, the reinforcing material is disposed on the entire circumference, as shown in FIG. 11. In this case, the outer wall and the reinforced part are integrally formed of the reinforcing material.

There is no particular limitation to the method by which the reinforcing material is disposed. For instance, a reinforcing material prepared in the form of a slurry by addition of water may be disposed in the cut portion, followed preferably by drying, firing and the like to make the reinforcing material solid. In this manner, a desired reinforcing effect is realized.

Alternatively, the honeycomb structure of the first aspect may be manufactured by forming a formed body already including a shape of the reinforced part in the forming step by using a predetermined shape of mouthpiece of extrusion forming and firing the formed body. In this case, the reinforcing step is included in the forming step and the firing step.

EXAMPLES AND COMPARATIVE EXAMPLES

The present invention is described in more detail below by way of Examples. However, the present invention is not restricted to these Examples.

(Production of the Honeycomb Structures)

As a material to be fired, a mixture of the cordierite forming raw material, namely, a mixture selected among talc, kaolin, calcinated kaolin, alumina, aluminum hydroxide, and silica is mixed at a predetermined ratio such that a chemical composition in the mixture is in the range of 42 to 56% by mass of $SiO_2$, 30 to 45% by mass of $Al_2O_3$, and 12 to 16% by mass of MgO was used. To this mixture, a pore-forming material, methylcellulose, hydroxypropoxylmethylcellulose, surfactant and water were added, and after mixing, a kneaded compound having plasticity was prepared by a vacuum kneading machine. This kneaded compound was subjected to extrusion forming to obtain a ceramic formed body. This ceramic formed body was dielectric and hot air dried, and fired at about 1420° C. in the room air atmosphere to obtain a honeycomb structure made of a cordierite material having a thickness of outer wall of 800 ìm, a thickness of partition wall of 300ìm, a cell density of 47 cells/cm$^2$ (300 cells/square inch), and a porosity of 60% in the form of a cylinder of 140 mm in diameter and 150 mm in length. After alternately plugging both ends constituting opening ends of cells to create checkered patterns, the honeycomb structure was fired again to obtain a honeycomb structure A to be used as a DPF. The compressive strength in the axial direction of the honeycomb structure A measured at a compressive speed of 2 cm/min. was 5 MPa.

Comparative Example 1

The honeycomb structure A was examined for the isostatic strength, pressure loss and occurrence of cracking during insertion into the can (canning) in the manner shown below.

(Isostatic strength) In conformance with the JASO standard M505-87, the honeycomb structure A was placed in a pressure container and the pressure at which the honeycomb structure A was broken was determined.

(Pressure loss) An exhaust gas containing fine particles (PM) discharged from a diesel engine at a gas temperature of 200° C. was allowed to flow thorough the honeycomb structure A at an exhaust gas flow rate of 2.4 Nm$^3$/min. and the pressure loss when 4 g of PM deposited on the honeycomb structure A was determined.

(Cracking by canning) The honeycomb structure A was canned so that it was held in a can of 150 mm in diameter and 160 mm in length via a ceramic mat of 8 mm in thickness, and occurrence of cracking during the canning was examined. This test was repeated for five honeycomb structural bodies and the number of cracked honeycomb structural bodies A was determined.

Examples 1 to 9 and Comparative Examples 2 to 4

Using the honeycomb structure A, a predetermined portion was cut so that it has difference in thickness from the remaining peripheral portion, namely mean thickness of the reinforced part in the direction of sectional center (reinforcing thickness), reinforcing range (width of reinforced part) and angle of range of reinforced part based on 45° direction from the partition wall about the sectional center (reinforcing angle), as well as reinforcing depth in the axial direction (reinforcing length). A ceramic cement prepared by mixing 80 parts by mass of cordierite powder and 20 parts by mass of inorganic binder was disposed in the cut portion, and dried at 1200° C. for 3 hours. As for Examples 6 to 9, the reinforced part was formed at a predetermined length from both ends as shown in FIG. 4. For each obtained honeycomb structure, the test as same as that conducted in Comparative Example 1 was conducted. The results are shown in Table 1.

Furthermore, according to the manufacturing method of the third aspect, it was possible to manufacture the honeycomb structure of the first aspect in favorable manner.

The invention claimed is:

1. A honeycomb structure comprising:
    an outer wall;
    partition walls disposed inside the outer wall; and
    a plurality of cells partitioned from one another by the partition walls, extending in the axial direction, each cell having a generally rectangular cross-section shape in the direction perpendicular to the axial direction;
    wherein the honeycomb structure has a reinforced part in a part of the outer wall, and the reinforced part in the cross section perpendicular to the axial direction of the honeycomb structure lies at least in the range from the point located at 40° on the outer wall to the point located at 50° on the outer wall and within the range from the point located at 30° on the outer wall to the point located at 60° on the outer wall, with respect to the longitudinal direction of the partition wall about a sectional center of the honeycomb structure;
    wherein a mean thickness of the reinforced part in the perpendicular cross-section in the direction of the sectional center is in the range of 1 to 10 mm,
    wherein the reinforced part is formed by plugging, and
    wherein the thickness of the partition walls not in the reinforced part are substantially uniform.

2. The honeycomb structure according to claim 1, wherein a sum of length of the reinforced part in the axial direction of the honeycomb structure is preferably ⅓ or more relative to whole length of the honeycomb structure in the axial direction.

3. The honeycomb structure according to claim 1, wherein the partition walls and the outer wall contain ceramics as a main component.

4. The honeycomb structure according to claim 3, wherein a main component of the ceramics is one or more kinds

TABLE 1

| | Width of reinforced part (mm) | Reinforcing angle (°) | Reinforcing thickness (mm) | Length of reinforced part (mm) | Isostatic strength (MPa) | Pressure loss (kPa) | Cracking by canning |
|---|---|---|---|---|---|---|---|
| Comparative Example 1 | — | — | — | — | 1.8 | 8.00 | 3/5 |
| Comparative Example 2 | 7.3 | ±3° | 2.0 | 150 (Entire length) | 2.0 | 8.04 | 2/5 |
| Comparative Example 3 | 48.8 | ±20° | 3.0 | 150 (Entire length) | 3.0 | 8.82 | 0/5 |
| Comparative Example 4 | 439.6 | Entire circumference | 3.0 | 150 (Entire length) | 3.0 | 8.49 | 0/5 |
| Example 1 | 12.2 | ±5° | 1.8 | 150 (Entire length) | 2.9 | 8.07 | 0/5 |
| Example 2 | 24.4 | ±10° | 1.8 | 150 (Entire length) | 2.9 | 8.14 | 0/5 |
| Example 3 | 36.6 | ±15° | 1.8 | 150 (Entire length) | 3.0 | 8.24 | 0/5 |
| Example 4 | 36.6 | ±15° | 3.8 | 150 (Entire length) | 3.2 | 8.23 | 0/5 |
| Example 5 | 36.6 | ±15° | 5.8 | 150 (Entire length) | 3.4 | 8.53 | 0/5 |
| Example 6 | 12.2 | ±5° | 1.8 | 40 + 40 | 2.5 | 8.07 | 0/5 |
| Example 7 | 12.2 | ±5° | 1.8 | 45 + 45 | 2.6 | 8.07 | 0/5 |
| Example 8 | 12.2 | ±5° | 1.8 | 50 + 50 | 2.8 | 8.07 | 0/5 |
| Example 9 | 12.2 | ±5° | 1.8 | 60 + 60 | 2.8 | 8.07 | 0/5 |

In Comparative Example 1, since the honeycomb structure A was not reinforced, the isostatic strength was poor and cracking was observed in three of five samples during canning. In Comparative Example 2, since the reinforcing width was too short, the isostatic strength did not increase, and cracking was observed in two of five samples during canning. In Comparative Examples 3 and 4, since the width of the reinforced part was too long, the degree of elevation of pressure loss relative to increase in isostatic strength was significant. Contrarily, in Examples 1 to 9, since the reinforcing thickness, width of reinforced part (and reinforcing angle) fell within the ranges according to the present invention, it was possible to increase the isostatic strength while suppressing elevation of pressure loss.

INDUSTRIAL APPLICABILITY

As explained in the above description, since the honeycomb structure according to the first aspect of the present invention had a thickness and a width of reinforced part falling within predetermined ranges, it was possible to set the isostatic strength higher, realize a honeycomb structure having resistance to breakage and keep the elevation of pressure loss low. Furthermore, since the exhaust emission control system according to the second aspect uses the honeycomb structure of the first aspect, the system is low in pressure loss and high in strength, suggesting a wide range of applications.

selected from the group consisting of alumina, mullite, lithium aluminum silicate, cordierite, silicon carbide and silicon nitride.

5. The honeycomb structure according to claim 1, wherein porosity of the partition wall is 50% or more.

6. The honeycomb structure according to claim 1, wherein compressive strength in the axial direction is in a range of 0.5 to 10 MPa.

7. The honeycomb structure according to claim 1, wherein opening ends of predetermined cells are plugged at one end face and opening ends of predetermined cells of the remaining cells are plugged at the other end face.

8. The honeycomb structure according to claim 7, wherein a catalyst capable of promoting combustion of diesel fine particles is held by the honeycomb structure.

9. An exhaust emission control system comprising:
an internal combustion engine;
an exhaust pipe for discharging an exhaust gas from the internal combustion engine; and
an emission control apparatus, connected to the exhaust pipe, for cleaning the exhaust gas,
wherein the emission control apparatus includes at least one honeycomb structure according to claim 1, and further includes a cushioning material disposed on the outer circumference of the honeycomb structure and a can holding at least therein the honeycomb structure via the cushioning material.

10. The honeycomb structure according to claim 1, wherein the reinforced part is located only in a vicinity of the outer wall.

11. A method of manufacturing a honeycomb structure having an outer wall; partition walls disposed inside the outer wall; a plurality of cells partitioned from one another by the partition walls, extending in the axial direction, each cell having a generally rectangular cross-section shape in the direction perpendicular to the axial direction; and a reinforced part provided in a part of the outer wall, the method comprising the steps of:
forming a formed body of the honeycomb structure;
firing the formed body to form a fired body; and
reinforcing for formation of the reinforced part,
wherein the reinforcing step is to form the reinforced part such that it lies at least in the range from the point located at 40° on the outer wall to the point located at 50° on the outer wall and within the range from the point located at 30° on the outer wall to the point located at 60° on the outer wall, with respect to the longitudinal direction of the partition wall about a sectional center of the honeycomb structure; and a mean thickness of the reinforced part in the perpendicular cross-section in the direction of the sectional center is in the range of 1 to 10 mm.

12. The method of manufacturing a honeycomb structure according to claim 11, wherein the reinforcing step is plugging opening ends of at least two adjacent cells located within the predetermined range on the same end face.

13. The method of manufacturing a honeycomb structure according to claim 11, wherein the reinforcing step includes cutting at least part of the fired body in the predetermined range and disposing a reinforcing material in the cut part.

14. The method of manufacturing a honeycomb structure according to claim 13, wherein the cutting step includes cutting the outer circumference of the fired body and cutting at least part of the partition wall within the predetermined range.

* * * * *